April 28, 1936.                    R. CLADE                    2,038,885
                              LUBRICATED VALVE
                           Filed Jan. 31, 1933              2 Sheets-Sheet 1
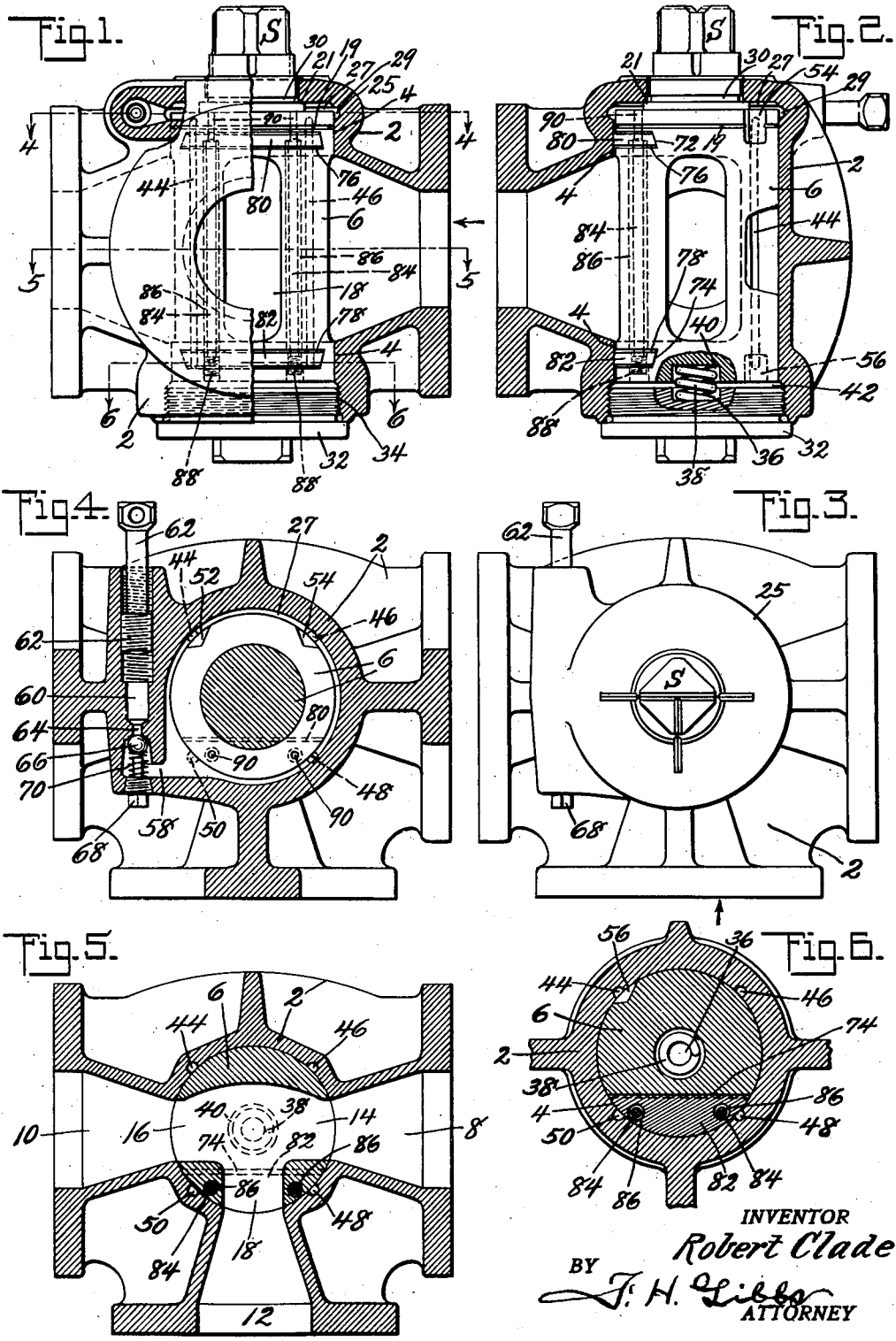
INVENTOR
Robert Clade
BY
J. H. Libbs
ATTORNEY April 28, 1936. R. CLADE 2,038,885
LUBRICATED VALVE
Filed Jan. 31, 1933 2 Sheets-Sheet 2
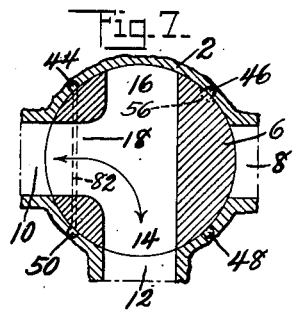
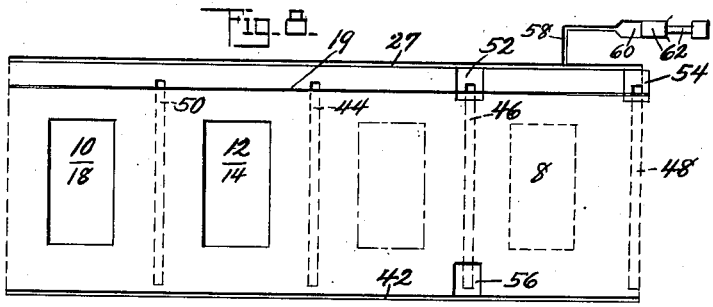
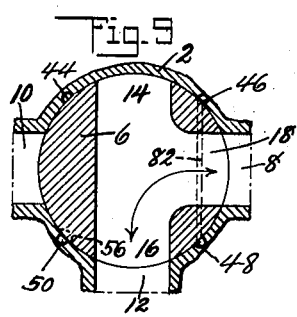
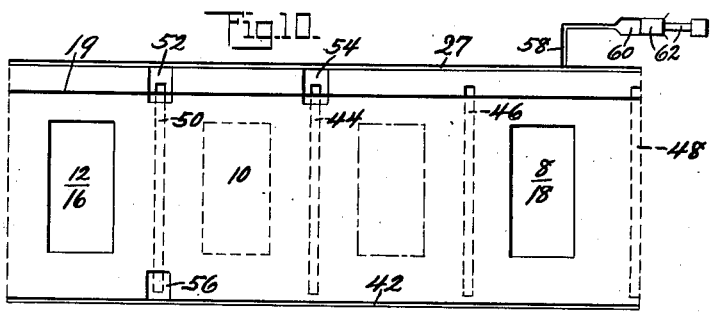
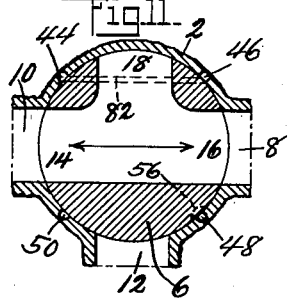
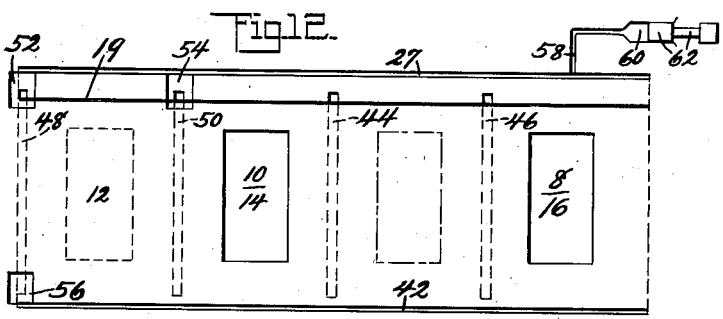
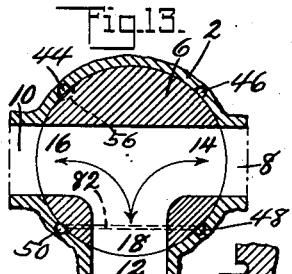
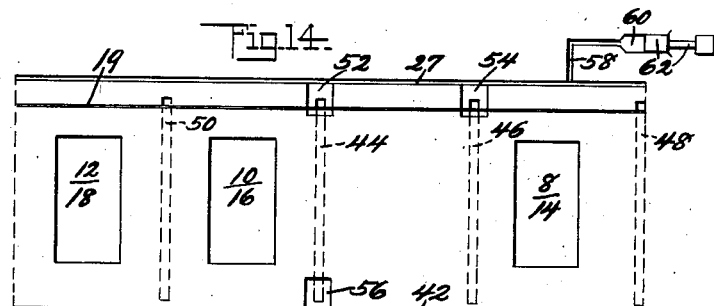
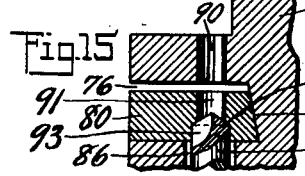
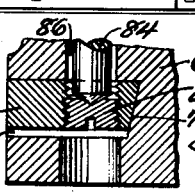
INVENTOR
Robert Clade
BY J. H. Gibbs
ATTORNEY Patented Apr. 28, 1936

2,038,885

UNITED STATES PATENT OFFICE 2,038,885

LUBRICATED VALVE

Robert Clade, Detroit, Mich., assignor to American Car and Foundry Company, New York, N. Y., a corporation of New Jersey Application January 31, 1933, Serial No. 654,405

25 Claims. (Cl. 251—93)

This invention relates to improvements in valves and has particular reference to plug valves of the type in which lubricant is forced under pressure between contacting surfaces of the valve plug and body or casing.

One object of this invention is the provision of a new and improved three-way lubricated valve.

Another object of this invention is the provision of a new and improved valve plug for lubricated valves of the three-way type.

Still another object of this invention is the provision of a three-way valve adapted to be lubricated by grease or suitable lubricant under pressure, said valve comprising a valve body and a plug mounted therein for rotation and capable of axial shifting movement in the body when the pressure of the lubricant becomes excessive whereby to permit escape of lubricant from the body to provide a visual signal to indicate that the valve is properly and completely lubricated.

A still further object of this invention is the provision of a lubricated valve in which sealing of the interior of the valve body at the head portion thereof is effected by a metal-to-metal contact of the valve plug and valve body.

Lubricated valves comprise generally a valve body having a plug rotatably mounted therein, the body and plug being provided with ports which are adapted to be placed into and out of register. It is well known in the art that in these lubricated valves lubricant is forced under pressure between the contacting surfaces of the plug and valve body and forms a film of grease which seals the valve against leakage. Heretofore it has been thought necessary to provide a lubricant seal at the head of the valve to provide leakage from the valve body. Tests have shown that a metal-to-metal contact between the valve body and valve plug at the head portion thereof is an effectual seal against leakage from the body. Theoretically the valve plug is supposed to seat within the valve body with substantially a perfect yet a rotatable fit, but actually, in practice, it has been found impossible to obtain cooperating valve plug and valve body surfaces so accurately machined as to provide a perfect fit between the valve plug and valve body. In view of this a certain looseness is present between the valve plug and valve body due to inequalities in machining which, when the valve is in certain positions, permits the plug to shift radially within the valve body as the result of line pressure directed against the plug. Obviously this shifting of the valve plug within the valve body provides an effectual seal against leakage out of the body into the port opposite that subjected to line pressure. At the same time this shifting provides a clearance of space between the plug and body at that portion of the body against which line pressure is directed to the plug. In a two-way valve such shifting of the valve plug presents substantially no disadvantages as it results in an effectual seal at the egress port of the valve body but in a three-way valve, with the valve plug in certain positions, it is obvious that such shifting will permit the leakage of fluid from the ingress port of the valve body around the plug and into the interior thereof and then out of egress openings in the valve plug and valve body.

In view of the beforementioned disadvantage another object of the present invention is to provide a lubricated valve preferably of the three-way type having means for preventing shifting of the plug in a radial direction within the body, such means being adjustable to effect a sealing relation between the valve plug and valve body at the area or zone subjected to line pressure.

A still further object of this invention is the provision of a lubricated valve having means associated with the valve plug for positioning or centering the plug within the body.

Other objects and advantages of this invention will be apparent from the following description taken in conjunction with the accompanying drawings in which:

Figure 1 is a side view of the valve taken in the direction of the arrow, Fig. 3, a portion of the valve being shown in side elevation and the remainder of the valve having the body shown in section to disclose the valve plug in side elevation; Fig. 1 also having certain parts broken away to disclose a lubricant feeding means.

Fig. 2 is a view of the valve taken in the direction of the arrow, Fig. 1, the valve housing being shown in section and certain parts of the plug and base plate being broken away to disclose other parts more clearly.

Fig. 3 is a top plan view of the valve shown in Fig. 1.

Fig. 4 is a sectional view on the line 4—4, Fig. 1.

Fig. 5 is a sectional view taken on the line 5—5, Fig. 1.

Fig. 6 is a sectional view taken on the line 6—6, Fig. 1.

Figs. 7, 9, 11 and 13 are substantially diagrammatic sectional views showing the valve plug in various positions within the body.

Figs. 8, 10, 12 and 14 are diagrammatic views showing the lubricant groove arrangements corresponding to the positions of the plug shown in Figs. 7, 9, 11 and 13 respectively.

Fig. 15 is a fragmentary sectional view at the upper end portion of the valve plug showing the wedge block, and Fig. 16 is a fragmentary sectional view at the lower end portion of the valve plug showing the wedge block and the adjusting means therefor.

Referring now more particularly to the drawings in which similar characters of reference designate similar parts in the several views, the valve of the present invention comprises a body or casing 2 having a longitudinal passageway or bore therein which provides a longitudinal seat 4 for the valve plug indicated at 6. The body 2 is provided with a plurality of port openings indicated at 8, 10 and 12 (see Fig. 5), while the plug 6 is hollow and is provided with ports 14, 16 and 18 respectively, adapted to register with the ports 8, 10 and 12 in the body.

In the instance shown the plug 6 is cylindrical and its upper end portion is provided with a circumferential grease groove 19. On the upper end portion of the plug 6 is formed a shoulder 21 which contacts with the bottom surface of a valve body head portion 25 which, in the instance shown, is formed integral with the body and is provided with an opening through which the stem S of the valve plug projects, the stem extending upwardly from the shoulder 21 of plug 6. As will be apparent, the shoulder 21 provides an annular portion at the upper end of the plug which is spaced from the head portion 25 and said space, indicated at 27, constitutes an upper lubricant chamber within the body 2. Within the head portion 25 an annular groove 29 is formed which is of such dimensions as to overlap the upper side portion of the valve plug 6. In effect, the body 2 is provided with a lubricant chamber adjacent the head portion 25 which is formed between the head portion and the upper end of the plug, the upper end portion of the plug projecting into said chamber so that the latter surrounds said upper end portion, as clearly shown in Figs. 1 and 2, whereby a portion of the side of the plug is exposed to lubricant within the lubricant chamber at all times. The stem S, as beforementioned, projects through the opening formed in the head portion 25 of the valve body and is spaced therefrom as shown at 30, and the upper end of the stem S is formed to receive a wrench or other suitable tool by which the plug 6 may be rotated.

The bottom of the valve body 2 is open but normally closed by a base plate 32 threadedly secured within the body as shown at 34 and provided with a spring seat 36 supporting a spring 38 which engages the lower end portion of the plug 6 in a recess or spring seat 40 formed therein; the spring constantly urging the valve plug in an upward direction to maintain metal-to-metal contact between the shoulder 21 and the lower surface of the head 25 of the valve body, thus sealing the body against leakage at the head portion. Due to the fact that the spring forces the valve plug 6 in an upward direction there is a space between the lower end of the plug 6 and the upper portion of the base plate 32, this space constituting a grease receiving chamber 42.

Formed in the seat 4 of the valve body are a plurality of longitudinally arranged lubricant grooves indicated at 44, 46, 48 and 50, the upper ends of which terminate above the grease groove 19 of the valve plug 6, as clearly shown in Fig. 2. Also as clearly shown in Fig. 2, these grooves are not of a length sufficient to extend to the lower end of plug 6 when the plug is properly seated within the valve body but they terminate in a plane above the lower end of said plug. As shown clearly in Fig. 5, the grooves 44 and 46 are arranged, respectively, adjacent one side of ports 10 and 8 while groove 48 is arranged between ports 8 and 12 and groove 50 between ports 10 and 12. In other words, as can be seen in this Fig. 5, a lubricant groove is arranged along opposite sides of each of the ports 8, 10 and 12.

Formed in the plug 6 adjacent its upper end portion and adapted to register with the upper end portions of adjacent body grooves are dwarf grooves 52 and 54 (see Fig. 4) while at the lower end portion of the plug and vertically alined with the dwarf groove 52 is a dwarf groove 56 (see Figs. 2 and 6). The dwarf grooves 52 and 54 open to the lubricant chamber 27 while the dwarf groove 56 opens to the lower grease chamber 42. As clearly shown in Fig. 2 the dwarf grooves 52 and 54 intersect the circumferential grease groove 19 formed in the plug and are of a length sufficient to over-lap the body grooves 44, 46, 48, and 50. It will be apparent from the above arrangement that when the dwarf grooves 52 and 54 are in register with either of the grooves 44, 46, 48 or 50 they convey grease from the grease chamber 27 to the circumferential groove 19 and to said body grooves 44, 46, 48 and 50 and to the lower grease chamber 42.

The grease chamber 27 is in communication by a port 58 with a lubricant reservoir shown clearly in Fig. 4 and comprising a lubricant feeding chamber 60 formed, in the instance shown, integral with the head 25, and arranged transverse to the longitudinal axis of the valve body and having a ram 62 therein adapted to force grease through an orifice 64 past a ball check valve 66 which normally closes said orifice. Action of the check valve is controlled by a set screw 68 extending through the body and acting against a compression spring 70 bearing against the ball valve 66.

As mentioned before, due to irregularities and inequalities in the cooperating surfaces of the seat 4 and plug 6, a certain looseness between the plug and seat usually results. These inequalities, while they may be very slight, may be sufficient to cause radial shifting of the plug in the body under the influence of line pressure exerted against the plug when the latter is in certain positions, which shifting may cause leakage from the valve body. The present design of valve includes means for compensating for the irregularities and inequalities in machining and, as shown clearly in Figs. 1 and 2, above and below port 18 of the valve plug recesses are formed, the inner walls of which are respectively oppositely beveled or inclined to form seats 72 and 74 respectively. The recesses are indicated at 76 and 78 respectively and are adapted to adjustably receive inserts such as wedge blocks 80 and 82, the rear end walls of which are inclined or beveled in accordance with the bevel of the seats 72 and 74, while the forward edges of said blocks are curved to conform to the seat 4 in the valve body. The blocks 80 and 82 are adapted to be moved upwardly and downwardly, respectively, in the recesses 76 and 78 in order to project or retract the blocks in their recesses by means of compression rods 84 arranged in longitudinal openings 86 formed in the plug 6, as clearly shown in Figs. 15 and 16. The upper block 80 is provided with recessed portions forming seats 87 with which the upper end portions of the rods 84 engage and the openings 86 are of sufficient diameter to permit radial movement of the rods 84 therein. The lower end portions of said rods are supported by set screws 88 threadedly engaged in the lower wedge block 82, as shown particularly in Fig. 16. It is apparent that upon adjustment of the set screws 88 the wedge blocks 80 and 82 are actuated within their respective recesses and can be moved outwardly into close engagement with the seat 4 in the valve body which will obviously compensate for any irregularities in machining of the seat 4 and the body of the plug 6 and will cause portions of the plug opposite the blocks 80 and 82 to be constantly maintained in sealing relation with the seat 4 regardless of the position of the plug 6. Extending through the upper portion of the plug into the recess 76 is an opening 90 adapted to convey lubricant from the upper lubricant chamber 27 into the recess 76. Formed in the block 80 and communicating with the recessed portions which receive the rods 84 are ducts 91 adapted to convey lubricant from the recess 76 to the openings 86 so that lubricant under pressure may pass into the lower recess 78; the lubricant, being under pressure, will obviously pass between the contacting surfaces of the plug 6 and the block 82. To provide for unrestricted passage of the lubricant from the ducts 91 to the openings 86 the upper end portions of the rods 84 have grooves 93 formed therein, as shown in Fig. 15.

With the valve assembled as shown in the drawings, to lubricate the valve ready for service the ram 62 is removed from the chamber 60 and grease placed into the latter. Actuation of the ram in chamber 60 causes grease to pass by the check valve 66 through the port 58 and into the upper lubricant chamber 27. This grease, being under pressure, will pass by means of the dwarf grooves 52 and 54 into the longitudinal body grooves 44, 46, 48 and 50 and some of the grease will pass into the lower lubricant chamber 42 by reason of the dwarf groove 56. This grease or lubricant is under pressure and hence will pass to the contacting surfaces of the plug and body. Since greases or lubricants are semi-solid and have high viscosity they do not conform to the law of the transmission of pressures of liquids. Therefore, when pressure is built up in chamber 27 by the injection of a lubricant, the pressure in the lubricant chamber 42 will not be raised to the same amount but will be appreciably less. In tests made of the present valve, it has been found that during the injection of a standard valve grease into the valve the pressure per square inch built up in chamber 42 is approximately 30% of the pressure in chamber 27. The drawings disclose the area of the lower end of the plug 6 as greater than the area of the upper end of said plug, but, since during the lubrication process the pressure built up per square inch of the plug head exposed in the lubricant chamber 27 greatly exceeds the pressure per square inch in chamber 42, it is obvious that when a predetermined pressure is reached in the chamber 27, the total pressure applied to the top of the plug will exceed that applied to the bottom by the lubricant and the spring 38, and the plug is thus permitted or forced to move axially whereby grease may leak out of the chamber 27 past the stem of the plug.

In the design of a valve, it will be apparent that by properly correlating the areas of the top and bottom of the plug which are exposed to lubricant pressure, and by utilizing a spring 38 of selected capacity, provision is made for causing the lubricant to leak out of the valve body when a predetermined lubricant pressure has been reached in the chamber 27. This obviously provides for protecting the valve against the building up of bursting pressures within the valve body. Increase of pressure within the upper lubricant chamber to a point in excess of the action of spring 38 and the grease pressure in lower lubricant chamber 42 will cause the plug 6 to move axially in the body and thus release the shoulder 21 from its seat against head 25 to provide a vent for grease from the body past valve stem S and a relief of pressure within the body, thus furnishing a safety device for the valve and a visual means for indicating that the valve is fully lubricated. When the pressure within the body 2 is reduced to a point below the compression of the spring 38 as the result of leakage of lubricant from the lubricant chamber through the aperture in the head portion, the plug will shift upwardly in the valve body and the shoulder 21 again contact with the valve body head portion 25.

The wedge blocks 80 and 82 having been previously adjusted, the valve is ready for service.

Figs. 7 to 14 indicate the various positons of the plug within the valve body. In Figs. 7 and 8 the valve body is so arranged that ports 10 and 12 of the body are connected through ports 14 and 18 of the valve plug. In this position of the valve the body port 8 is closed. Pressure may come from a line in the direction of either head of the arrow shown in this Fig. 7, which, of course, will tend to shift the plug 6 towards the body port 8. If there is no line pressure through port 8 towards the valve body 2 an effectual seal of port 8 is effected by the plug 6 provided the line pressure is through port 10 into port 18 of the plug 6. However, if there be line pressure through port 8 against the plug 6 the wedge blocks 80 and 82, which serve to position the plug 6 within the body 2 and against its seat, prevent shifting of the plug 6 against line pressure through port 8 and thus the sealing of port 8 is maintained and no fluid can pass the plug 6 into either the central bore of the plug or into the port 12. In Fig. 8 the grease grooves 46 and 48 are connected with the grease chamber 27 by the dwarf grooves 52 and 54 and a grease seal is provided around the port 8 by grease from chamber 27 passing through the dwarf grooves 52 and 54 into body grooves 46 and 48 and then into the lower grease chamber 42 through the dwarf groove 56, the grease in chamber 27 being under pressure.

In Fig. 9 the body port 8 is connected with body port 12 through plug ports 18 and 16, respectively, for flow of fluid either through port 8 or through port 12. In this example, the wedges obviously restrain the plug against radial shifting in the body 2 and effect a seal of the plug and body at port 10. The fluid may flow in the direction of either head of the double-headed arrow shown in this figure, but if at the same time there is fluid pressure against the plug 6 through port 10 it is obvious that there will be no leakage from port 10 into the body or plug 6 because of the sealing relation of the plug and body at port 10. In the groove arrangement shown in Fig. 10 for the plug position shown in Fig. 9, grease seals the body port 10 by the connection of dwarf grooves 52 and 54 with grease chamber 27 and the longitudinal body grooves 44 and 50, pressure of the grease acting also through dwarf groove 56 to the lower grease chamber 42. In the position of the plug shown in Fig. 11 fluid under pressure can pass directly through the valve body either from port 8 or from port 10, and body port 12 is sealed by reason of the connection of dwarf grooves 52 and 54 with grease chamber 27 and body grooves 48 and 50 and by dwarf groove 56 with lower grease chamber 42. It will also be apparent that the wedges 80 and 82 provide for proper positioning of the plug 6 in the body 2 in the position of the valve illustrated in Fig. 11 whereby, if there be line pressure through port 12 against the plug 6, no leakage of fluid can occur into the valve body because of the sealing relation effected between the plug 6 and the body 2 at the port. In Fig. 13, each of the body ports is in register with each of the plug ports for the passage of fluid through the valve in any direction and in this instance the closed side of the valve body, or that side not provided with a body port, provides for lubrication of the contacting surfaces of the plug and body by reason of the connection of dwarf grooves 52 and 54 with chamber 27 and the body grooves 44 and 46, dwarf groove 56 connecting body groove 44 with the lower grease chamber 42.

From the above description it is believed that the construction and operation of the valve of the present invention will be fully apparent to those skilled in the art. A valve is provided which has the contacting surfaces of the plug and valve body fully lubricated for sealing purposes and for ease of operation. Due to the arrangement of the plug within the body over-lubrication such as might tend to burst the valve body or render the plug difficult to rotate is prevented by reason of the fact that the valve plug may shift axially within the body when the pressure within the body is sufficient to overcome the action of spring 38 whereby grease in excess of that required for proper lubrication is permitted to leak out through the head 25 past the stem S, thus advising that the valve is fully and properly lubricated. The valve provides a grease chamber in the head portion thereof into which the upper end portion of the plug projects so that a portion of the side of the plug is always directly exposed to lubricant in the chamber. However, in connection with this feature substantially the same effect may be obtained by omitting the annular groove 29 and beveling the upper edge portion of the valve plug so that grease under pressure may extend down a portion of the side of the plug. Due to the particular wedge feature shown and described it is apparent that the valve plug is retained against radial shifting within the body which compensates for irregularities in the contacting machined surfaces of the plug and body, thus preventing leakage around the plug from the body ports when the valve plug is in certain positions within the body. The specific groove arrangement shown and described provides for substantially though not entirely surrounding the body port openings in accordance with various positions of the valve plug within the body. It has been found that it is not necessary to entirely surround a port opening in order to provide an effectual seal for the reason that the valve plug has a sufficient amount of lubricant on its outer surface to effect a seal, the body grooves constituting really a source of supply of lubricant for the outer longitudinal surface of the valve plug.

The drawings illustrate one embodiment of the invention but it is to be understood that they are for illustrative purposes only and various changes in the form and proportions of the valve may be made within the scope of the appended claims without departing from the spirit of the invention.

What is claimed is:

1. In a lubricated valve, a plug having a stem, a valve body having an internal seat for said plug, a shoulder formed on the upper end portion of said plug, an integral head portion for said valve body with which said shoulder contacts in sealing relation, an annular groove formed in the head portion and lapping the side of said plug, a lubricant chamber including said groove surrounding the upper end portion of the plug, a lubricant reservoir in direct communication with said lubricant chamber and means for forcing lubricant under pressure directly from the reservoir into said chamber.

2. In a lubricated valve, a plug, a valve body having an integral head portion and an internal seat for said plug, means on said plug engaging the internal seat for maintaining said plug at all times in sealing relation with said seat at points diametrically opposite said means, a shoulder at the upper end portion of the plug engaging the head portion in sealing relation, a lubricant chamber defined in part by the upper end portion of the plug and into which said upper end portion projects whereby a portion of the side of the plug is directly exposed to lubricant in the chamber, a lubricant reservoir adjacent said chamber and means for forcing lubricant under pressure from said reservoir directly into said chamber.

3. In a lubricated valve, a plug, a valve body having an internal seat for said plug, a shoulder formed on the upper end portion of the plug, an integral head portion for said body with which said shoulder contacts in sealing relation, a lubricant chamber defined in part by the upper end portion of said plug and into which the upper end portion of the plug projects, means carried by said plug and adjustable relative thereto into engagement with the plug seat for restraining said plug against radial shifting in the body, a lubricant reservoir adjacent said chamber, and means for forcing lubricant under pressure from said reservoir directly into said lubricant chamber.

4. In a lubricated valve, a plug, a valve body having an internal seat for said plug and provided with an integral head portion, a shoulder formed on the upper end portion of the plug and engaging said head portion in sealing relation, a lubricant chamber in said head portion into which the upper end portion of the plug projects, adjustable wedge elements carried by the plug and adapted to engage the seat in said body to restrain the plug against radial shifting in said body, spring means acting against the lower end portion of the plug for maintaining the shoulder in contact with said head portion, a lubricant reservoir adjacent said chamber, and means for forcing lubricant under pressure from the reservoir directly into said chamber.

5. In a lubricated valve, a plug, a valve body having an internal seat for said plug and a head portion, a shoulder formed on the upper end portion of the plug and adapted to engage the head portion in sealing relation, a lubricant chamber in the body defined in part by the upper end portion of the plug and into which said plug projects whereby a portion of the side of the plug is directly exposed to lubricant in said chamber, adjustable wedge elements carried by the plug and engaging the seat in said body for restraining the plug against radial movement in the body, spring means acting against the lower end portion of the plug for retaining the shoulder in engagement with said head portion, longitudinal grooves in the valve body having their upper ends terminating short of the lubricant chamber, grooves in the plug at the upper end portion thereof in communication with said lubricant chamber and over-lapping said body grooves, and means for maintaining lubricant under pressure in said lubricant chamber.

6. A lubricated valve comprising a body having a lubricant chamber formed in the head portion thereof, a plug in said body having its upper end portion projected into the lubricant chamber, said plug being rotatable and axially shiftable in said body, a shoulder formed on the upper end portion of the plug, spring means acting against the lower end portion of the plug and normally maintaining the shoulder in sealing engagement with the head portion of said body, and means for forcing lubricant under pressure into said chamber to cause axial movement of the plug against the action of the spring when the pressure within the body exceeds said spring action to cause separation of said shoulder and head portion and permit escape of excess lubricant from the chamber.

7. A lubricated valve comprising a body having an integral apertured head portion, a plug axially movable and rotatable within said body and provided with a shoulder at its upper end portion normally in sealing engagement with the lower surface of the head portion at the aperture, a lubricant chamber in the head portion surrounding said shoulder and lapping a portion of the side of said plug, spring means acting against said plug to normally maintain sealing relation of said shoulder and head portion, and means for lubricating the valve including means for forcing lubricant under pressure into said chamber to cause axial movement of said plug against the action of said spring means to free the shoulder from said head portion and establish communication between said aperture and lubricant chamber.

8. A lubricated valve comprising a body having an integral apertured head portion, a plug axially movable and rotatable within said body and having a shoulder formed with the upper end portion thereof normally contacting with the bottom surface of the head portion at the aperture to seal the body against leakage, a lubricant chamber in the head portion into which the upper end portion of the plug projects whereby a portion of the side of the plug is directly exposed to lubricant in the chamber, wedge means carried by said plug and engaging the interior of the body to restrain said plug against radial shifting in the body, spring means acting against said plug to normally maintain sealing relation of said shoulder and head portion, and means for lubricating the valve including means for forcing lubricant under pressure into the lubricant chamber to cause axial movement of said plug against the action of the spring when the pressure within the body exceeds the spring action to establish communication between the aperture in said head portion and said lubricant chamber whereby to permit escape of excess lubricant from said chamber.

9. In a valve, a valve body, a plug rotatably mounted in said body, said body and plug having fluid ingress and egress ports, and adjustable means carried by said plug and shiftable longitudinally of the plug into engagement with said body for preventing radial shifting of the plug in the body.

10. In a valve, a body having a longitudinal bore providing a plug seat, an apertured head portion formed with the body, a plug in said seat, a shoulder formed with the upper end portion of the plug and in metal-to-metal sealing contact with said head portion, a lubricant chamber defined by over-lapping portions of said head portion and plug, a spring in the body for retaining said shoulder in contact with the head portion, and means for lubricating the valve including means for forcing lubricant under pressure into said chamber to cause axial shifting of the plug when the pressure in said chamber exceeds the spring action whereby to effect separation of the shoulder and head portion and establish communication between the lubricant chamber and the aperture in the head portion.

11. In a three-way valve, a body having a longitudinal bore providing a plug seat and having a plurality of fluid ports, a plug seated in the body and having a plurality of ports adapted to register with said body ports, an apertured head portion formed with the valve body, a shoulder on the upper end portion of the plug in sealing engagement with the head portion, a lubricant chamber in part defined by the upper end portion of the plug and into which said upper end portion projects whereby a portion of the side of said plug is directly exposed to lubricant in said chamber, spring means normally maintaining said shoulder and head portion in sealing engagement, adjustable wedge means in said plug arranged, respectively, above and below one of the fluid ports of said plug engaging the seat in said body for maintaining diametrically opposite portions of said plug at all times in sealing engagement with said body seat, and means for lubricating said valve including means for forcing lubricant under pressure into said lubricant chamber to cause axial movement of said plug in the body when pressure within the body exceeds the spring action so as to permit escape of excess lubricant from the body through the aperture in said head portion.

12. In a valve, a valve body, a plug rotatably seated therein, fluid ingress and egress ports in said body and plug, inserts in the plug adapted to engage the body, means for adjusting said inserts into engagement with the body whereby to prevent radial shifting of the plug under line pressure exerted thereagainst, and means for forcing lubricant under pressure to the contacting surfaces of the plug and body and through the plug around the inserts.

13. In a valve, a valve body having an internal plug seat, a plug rotatably fitting said seat, an integral head portion for said body, a shoulder formed at the upper end portion of said plug and contacting with the lower surface of said head portion, a lubricant chamber defined in part by over-lapping portions of the head portion and plug, recesses formed adjacent the upper and lower end portions of the plug, wedge blocks arranged in said recesses, longitudinally arranged openings in the plug connecting the upper and lower recesses and having compression rods therein engaged with said wedge blocks, a lubricant duct connecting said lubricant chamber and the upper recess, and means for forcing lubricant under pressure to said lubricant chamber and to the contacting surfaces of the plug and valve body and into the recesses and said longitudinal openings.

14. In a valve, a valve body having an internal plug seat, a plug rotatably fitting said seat, an integral head portion for said body, a shoulder formed at the upper end portion of said plug and contacting with the lower surface of said head portion, a lubricant chamber defined in part by over-lapping portions of the head portion and plug, recesses formed adjacent the upper and lower end portions of the plug, wedge blocks arranged in said recesses, longitudinally arranged openings in the plug connecting the upper and lower recesses and having compression rods therein engaged with said wedge blocks, and a lubricant duct connecting the lubricant chamber and the upper recess.

15. In a lubricated valve, a body having a longitudinal bore providing an internal plug seat, a head portion for the body, a valve plug fitting the plug seat, a lubricant chamber defined between overlapping portions of the plug and head portion, a lubricant reservoir in the upper end portion of the valve having direct communication with the lubricant chamber, resilient means normally maintaining the upper end portion of the plug in sealing engagement with the head portion, and means for forcing lubricant under pressure from the reservoir directly into the lubricant chamber, said resilient means being so formed and arranged as to yield in response to pressure in the lubricant chamber sufficient to cause axial movement of the plug in the body to permit escape of excess lubricant from said lubricant chamber.

16. In a lubricated valve, a body having a longitudinal bore providing an internal plug seat, a head portion for the body, a valve plug fitting the plug seat, a lubricant chamber defined between overlapping portions of the plug and head portion, a lubricant reservoir formed in the body and arranged at the upper end portion of the body in a plane substantially transverse to the longitudinal plane of the plug seat and having direct communication with the lubricant chamber, spring means acting against the lower end of the plug for normally maintaining the upper end portion of the plug in sealing engagement with the head portion, a stem on the plug projecting through the head portion in such a manner as to provide a clearance between the head portion and stem, lubricant grooves between the plug seat and plug and adapted to receive lubricant from the lubricant chamber, and means for forcing lubricant under pressure from the reservoir directly into the lubricant chamber to cause lubricant to pass from said lubricant chamber into the lubricant grooves and to cause axial shifting of the plug in the body when the pressure in said lubricant chamber exceeds the spring action so as to effect separation of the plug and head portion and permit escape of excess lubricant from the body through said clearance.

17. In a valve, a valve body, a plug rotatably seated in the valve body, fluid ingress and egress ports in said body and plug, and means for maintaining the plug in sealing relation with the ingress port in said body when said plug closes said port comprising spaced inserts in the plug so arranged as to be shiftable longitudinally of the plug, and means extending between said inserts operative to effect simultaneous shifting thereof into engagement with the body whereby to restrain the plug against radial movement.

18. A lubricated valve comprising a body having a lubricant chamber formed in the head portion thereof, a plug in said body, said plug being rotatable and axially shiftable in said body, a shoulder formed on the upper end portion of the plug, spring means acting against the lower end portion of the plug and normally maintaining the shoulder in sealing engagement with the head portion of the body, and means for forcing lubricant under pressure into said lubricant chamber to cause axial movement of the plug against the action of the spring when the pressure within the body exceeds said spring action to cause separation of said shoulder and head portion and permit escape of excess lubricant from the lubricant chamber.

19. In a valve, a valve body, a plug rotatably mounted in said body, said body and plug having fluid ingress and egress ports, and adjustable means carried by said plug and shiftable longitudinally and radially of the plug into engagement with said body for preventing radial shifting of the plug in the body.

20. In a lubricated valve, a body, a plug rotatably mounted in the body, a head portion for the body, a lubricant chamber defined between overlapping portions of the plug and head portion, means for forcing lubricant under pressure into the lubricant chamber, and means normally maintaining the upper end portion of the plug in engagement with the head portion so formed and arranged as to yield in response to pressure in the lubricant chamber sufficient to cause axial movement of the plug in the body and separation of the plug and head portion whereby to permit escape of excess lubricant from the valve.

21. In a lubricated valve, a body, a plug rotatably mounted in the body, a head portion for the body, lubricant grooves between the body and plug, a lubricant chamber defined between overlapping portions of the plug and head portion, means for forcing lubricant under pressure into the lubricant chamber and into the lubricant grooves, and means normally maintaining the upper end portion of the plug in engagement with the head portion so formed and arranged as to yield in response to pressure in the lubricant chamber sufficient to cause axial movement of the plug in the body and separation of the plug and head portion to permit escape of excess lubricant from the valve.

22. In a lubricated valve, a body, a plug rotatably mounted in the body, a head portion for the body, a lubricant chamber defined between overlapping portions of the plug and head portion, resilient means normally maintaining the upper end portion of the plug in metal to metal sealing contact with the head portion, and means for lubricating the valve including means for forcing lubricant under pressure into the lubricant chamber to cause axial movement of said plug in the body against the action of said resilient means to effect separation of the plug and head portion and permit escape of excess lubricant from the valve.

23. In a lubricated valve, a body having a longitudinal bore providing an internal plug seat, an integral head portion for said body, a valve plug fitting the plug seat and provided with a reduced upper end portion constituting a shoulder adapted to contact with the head portion in sealing relation, a lubricant chamber in the body defined between the head portion and the plug, spring means normally retaining the shoulder and head portion in sealing engagement, a stem extending from the plug through the head portion, a lubricant reservoir adjacent the aforesaid lubricant chamber, a duct directly connecting said lubricant reservoir and said lubricant chamber, and means for forcing lubricant under pressure from the reservoir through such duct to the lubricant chamber.

24. In a lubricated valve, a body, a plug rotatable in the body and provided with a stem, a head portion for the body, a lubricant chamber surrounding the stem and arranged between the head portion and plug, sealing means so arranged as to normally prevent escape of lubricant from the lubricant chamber, and means for forcing lubricant under pressure into the lubricant chamber to cause axial movement of the plug in the body to break the seal provided by the sealing means and to permit escape of excess lubricant from the body.

25. In a lubricated valve, a body having a head portion, a plug rotatable in the body, a lubricant chamber arranged between overlapping portions of the head portion and plug, longitudinal lubricant grooves in the plug communicating with the lubricant chamber, a lubricant reservoir, and means for forcing lubricant from said reservoir under pressure to feed said grooves and chamber, said plug being so arranged in the body as to shift axially therein when said chamber and grooves are filled to permit escape of excess lubricant from the body.

ROBERT CLADE.